US008372937B2

(12) United States Patent
Trabesinger et al.

(10) Patent No.: US 8,372,937 B2
(45) Date of Patent: Feb. 12, 2013

(54) TWO-COMPONENT ADHESION PROMOTER COMPOSITION AND USE OF PACKAGING COMPRISING TWO COMPARTMENTS

(75) Inventors: Gerald Trabesinger, Kaltbrunn (CH); Gerhard Zingerle, Wil (CH); Wolf-Rüdiger Huck, Zürich (CH); Stefan Junge, Berlin (DE)

(73) Assignee: Sika Technology AG, Zurich (CH)

( * ) Notice: Subject to any disclaimer, the term of this patent is extended or adjusted under 35 U.S.C. 154(b) by 438 days.

(21) Appl. No.: 12/000,850

(22) Filed: Dec. 18, 2007

(65) Prior Publication Data

US 2008/0283425 A1 Nov. 20, 2008

Related U.S. Application Data

(63) Continuation of application No. 10/593,623, filed as application No. PCT/EP2005/051355 on Mar. 23, 2005.

(30) Foreign Application Priority Data

Mar. 23, 2004 (EP) .................................... 04006906

(51) Int. Cl.
*C08G 77/26* (2006.01)

(52) U.S. Cl. .............. 528/38; 528/32; 528/30; 401/132; 401/133; 401/134; 401/135

(58) Field of Classification Search .................... 528/38, 528/32, 30; 401/132, 133, 134, 135
See application file for complete search history.

(56) References Cited

U.S. PATENT DOCUMENTS

| | | | | |
|---|---|---|---|---|
| 3,615,302 | A * | 10/1971 | Rowse et al. | 51/295 |
| 5,621,060 | A | 4/1997 | Bayly et al. | |
| 6,037,008 | A * | 3/2000 | Huang et al. | 427/387 |
| 6,200,684 | B1 * | 3/2001 | Yamaguchi et al. | 428/447 |
| 6,340,097 | B1 * | 1/2002 | D'Alessio et al. | 401/132 |
| 6,511,752 | B1 | 1/2003 | Yao et al. | |
| 2007/0215267 | A1 * | 9/2007 | Brown | 156/158 |

FOREIGN PATENT DOCUMENTS

| | | | |
|---|---|---|---|
| EP | 0 346 768 | A2 | 12/1989 |
| EP | 0 577 014 | A1 | 1/1994 |
| EP | 0 615 965 | A2 | 9/1994 |
| EP | 0 731 143 | A2 | 9/1996 |
| EP | 0 761 738 | A1 | 3/1997 |
| EP | 0 985 718 | A2 | 3/2000 |
| EP | 0 987 317 | A1 | 3/2000 |
| FR | 2 616 322 | A1 | 12/1988 |
| JP | 55-074658 | | 6/1980 |
| JP | 2-38432 | A | 2/1990 |
| JP | 11-50006 | A | 2/1990 |
| JP | 2-222475 | A | 9/1990 |
| JP | 4-57766 | A | 2/1992 |
| JP | 04-078663 | B2 | 3/1992 |
| JP | 6-271373 | A | 9/1994 |
| JP | 08-302272 | A | 11/1996 |
| JP | 8-311404 | A | 11/1996 |
| JP | 9-100449 | A | 4/1997 |
| JP | 11-47235 | A | 2/1999 |
| JP | 11-130156 | A | 5/1999 |
| JP | 11-147982 | A | 6/1999 |
| JP | 2000-501980 | A | 2/2000 |
| JP | 2000-212513 | A | 8/2000 |
| JP | 2003-534901 | A | 11/2003 |
| JP | 2006-502285 | A | 1/2006 |
| WO | WO 97/18269 | A1 | 5/1997 |
| WO | WO 01/91923 | A1 | 12/2001 |
| WO | WO 2004/033523 | A1 | 4/2004 |

OTHER PUBLICATIONS

JP 11-147982 Machine translation (1999).*
International Search Report (Form PCT/ISA/210) issued in corresponding PCT/EP2005/051355 and dated Jun. 30, 2005; and Written Opinion of the International Searching Authority (Form PCT/ISA/237) issued in corresponding PCT/EP2005/051355 and dated Jun. 30, 2005.
English translation of Office Action (Notice of Reasons for Rejection) issued by the Japanese Patent Office issued in corresponding Japanese Patent Application No. 2007-504421 dated Jul. 6, 2010.
Umemoto et al., "Effects of Silance Coupling Agent with Various Functional Groups on Various Alloys," Bulletin of Kanagawa Dental College, Sep. 1996, vol. 24, No. 2, pp. 65-71.

* cited by examiner

*Primary Examiner* — Kuo-Liang Peng
(74) *Attorney, Agent, or Firm* — Buchanan Ingersoll & Rooney PC

(57) ABSTRACT

The present invention discloses a two-component adhesion promoter composition for surface pretreatment, comprising two components, the first component, K1, comprising at least one hydrolyzable adhesion promoter substance A which is selected from the group comprising organosilicon compounds, organotitanium compounds, organozirconium compounds, and mixtures thereof; and the second component, K2, comprising at least one compound B which reacts with the adhesion promoter substance A or triggers or catalyzes condensation of the adhesion promoter substance A, and the first and the second components in the unopened state being present in two compartments (1, 2) separated from one another by at least one dividing wall (3).
Additionally disclosed are the use of a pack (5) having two compartments (1, 2) which are separated from one another by a dividing wall, and a package (6) composed of a pack (5) and of a two-component adhesion promoter composition, in the compartments (1, 2) separated from one another by a dividing wall 3.

50 Claims, 7 Drawing Sheets

Figure 1
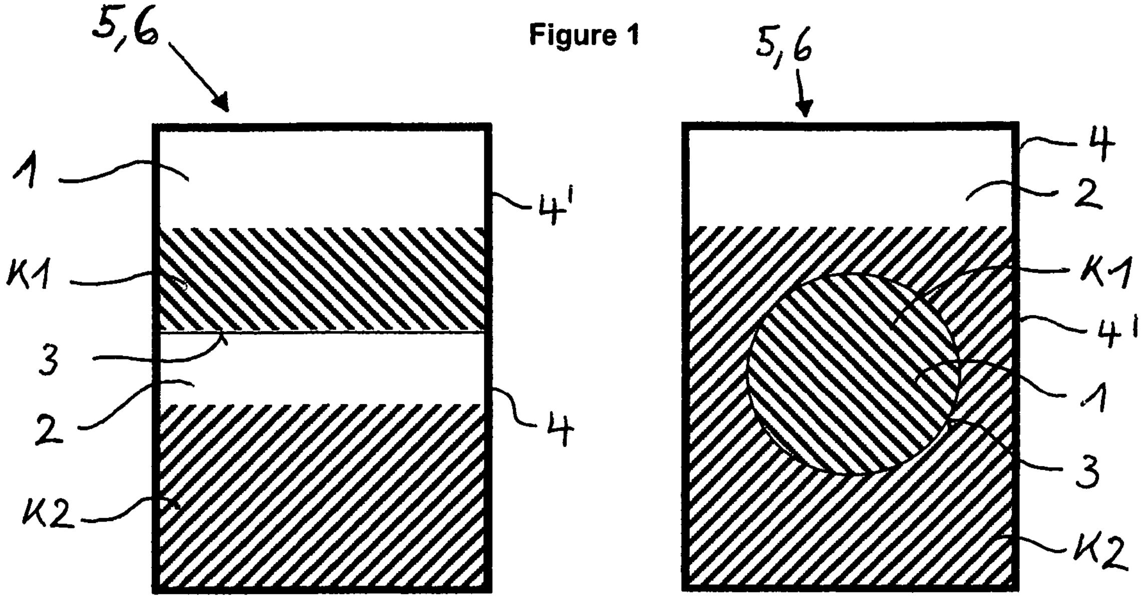
Fig. 1a) Fig. 1b)
Figure 2
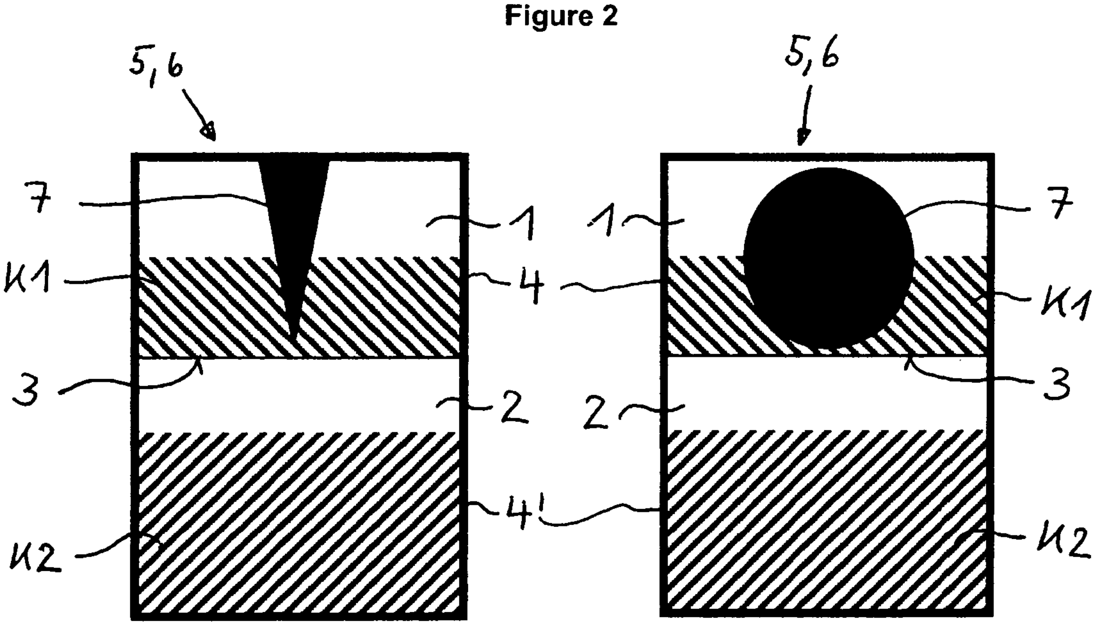
Fig. 2a) Fig. 2b)

Figure 3
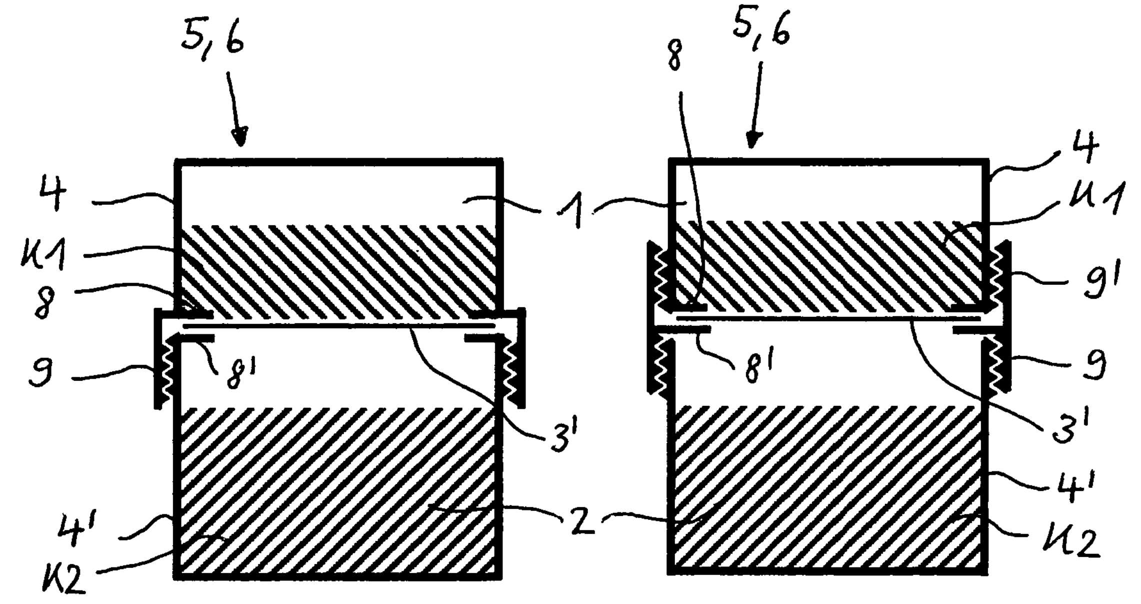
Fig. 3a) Fig. 3b)
Figure 4
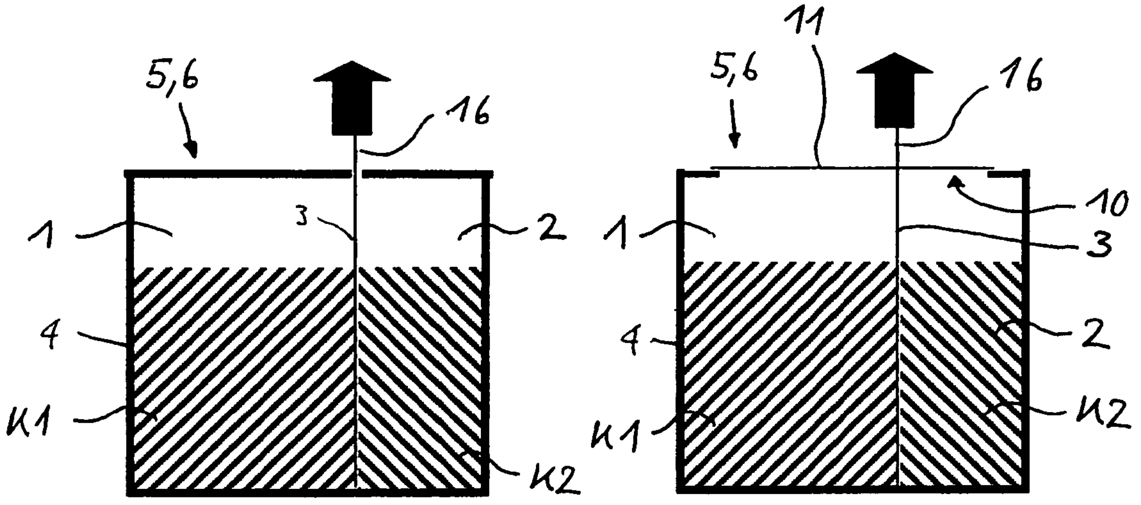
Fig. 4a) Fig. 4b)

Figure 5
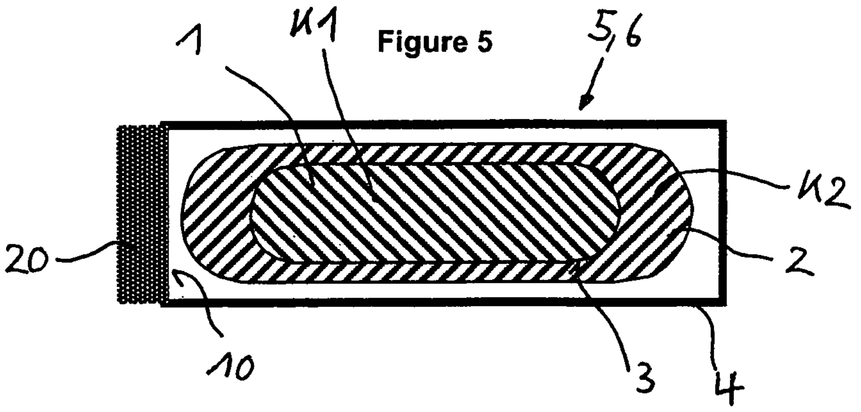
Figure 6
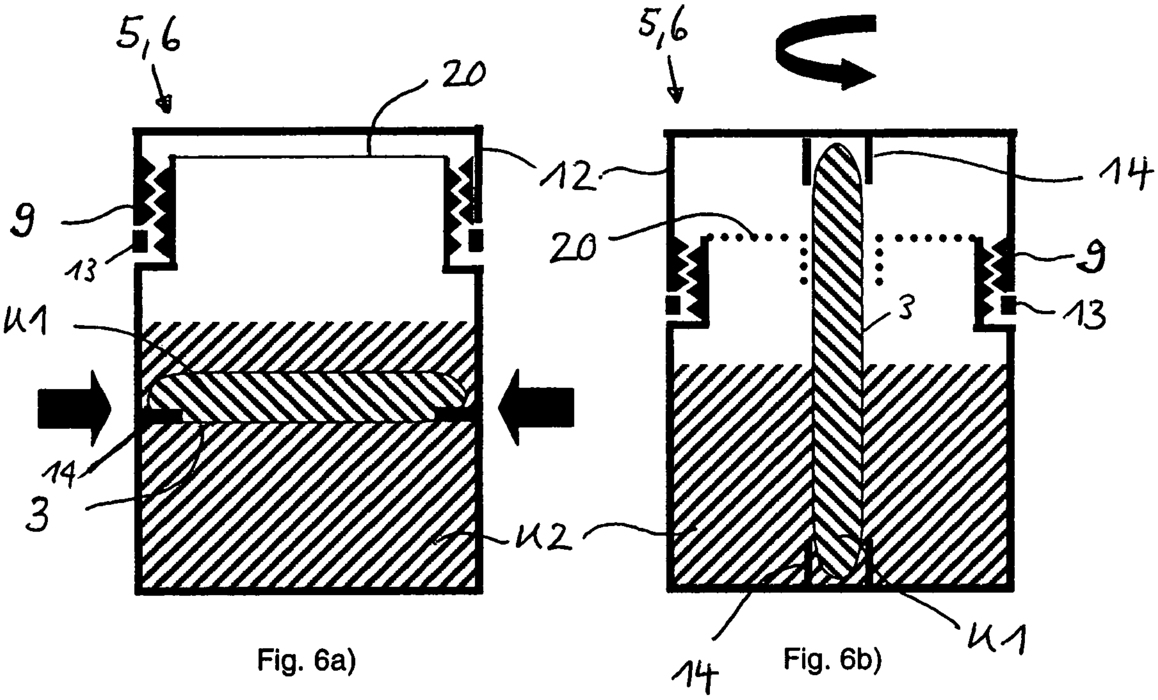
Fig. 6a)
Fig. 6b)

Figure 7
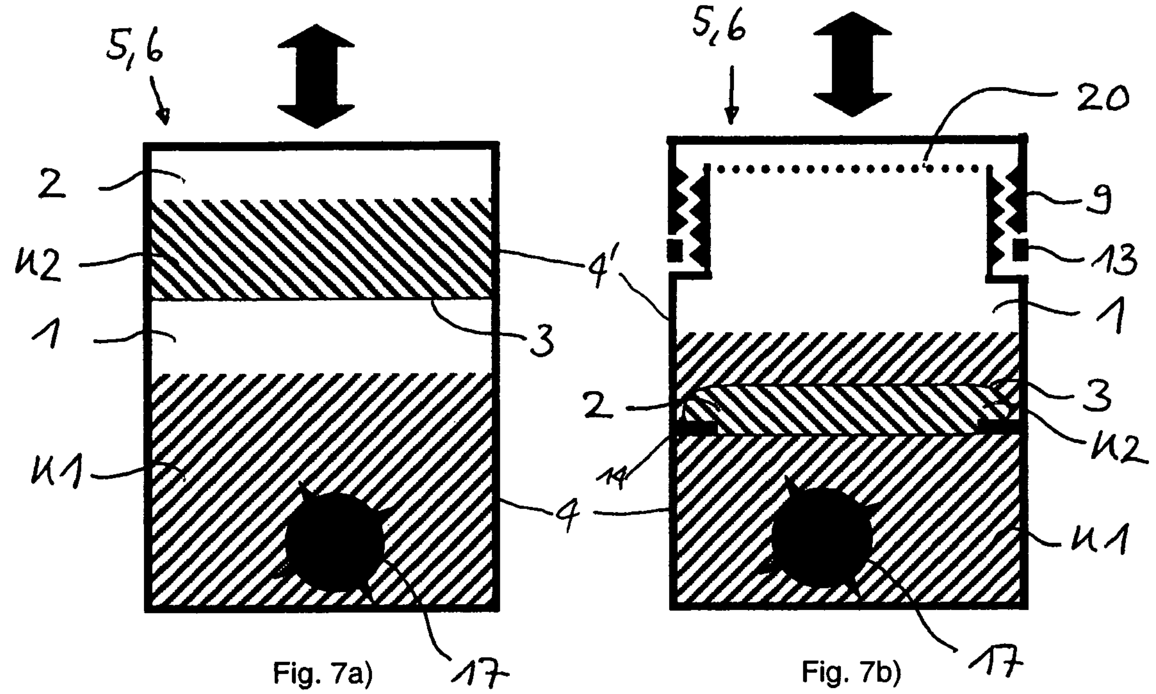
Fig. 7a)
Fig. 7b)
Figure 8
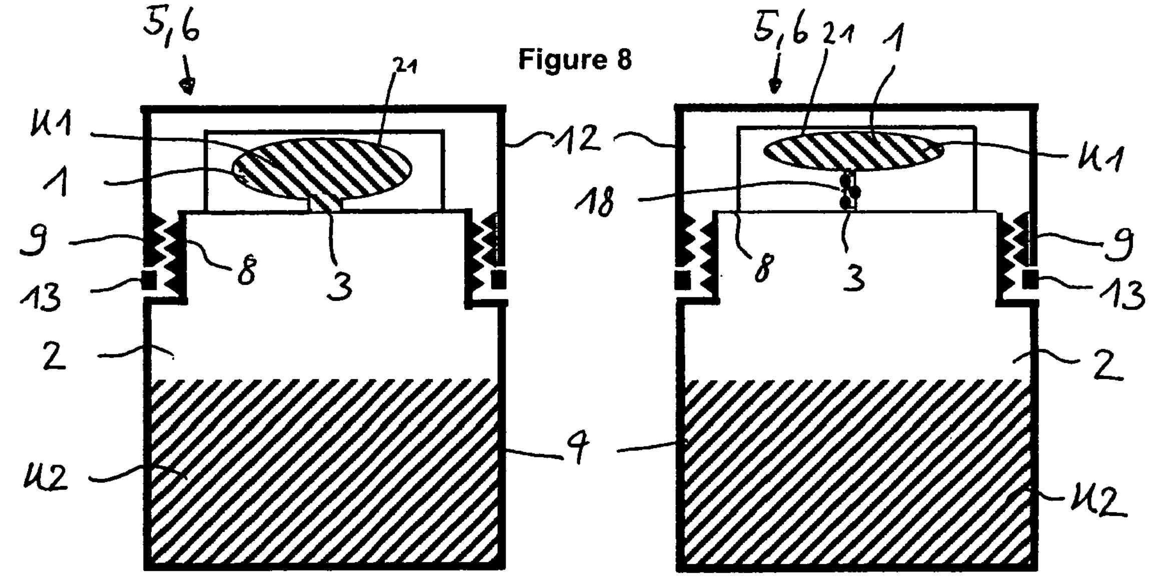
Fig. 8a)
Fig. 8b)

Figure 9
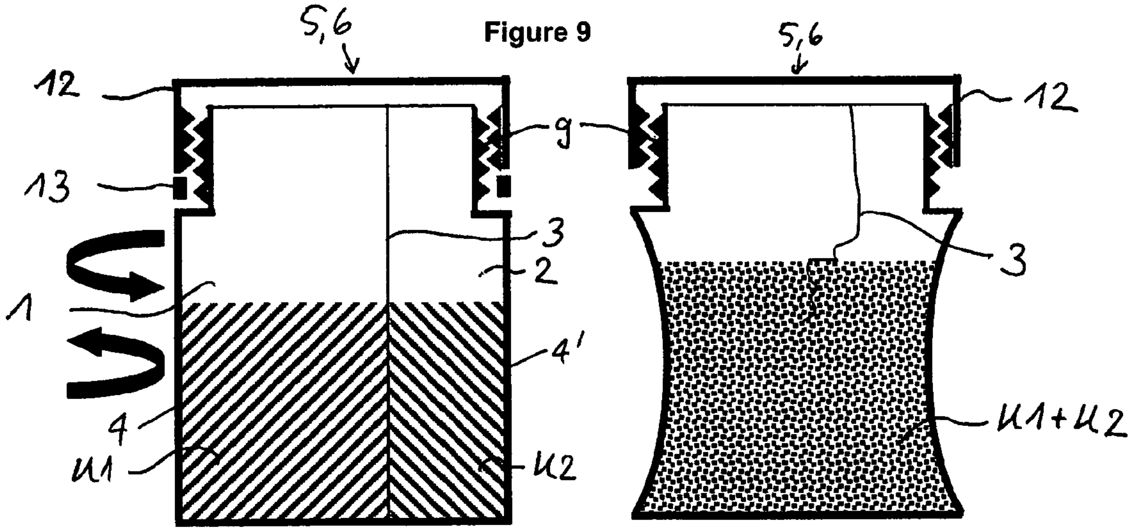
Fig. 9 Fig. 9'
Figure 10
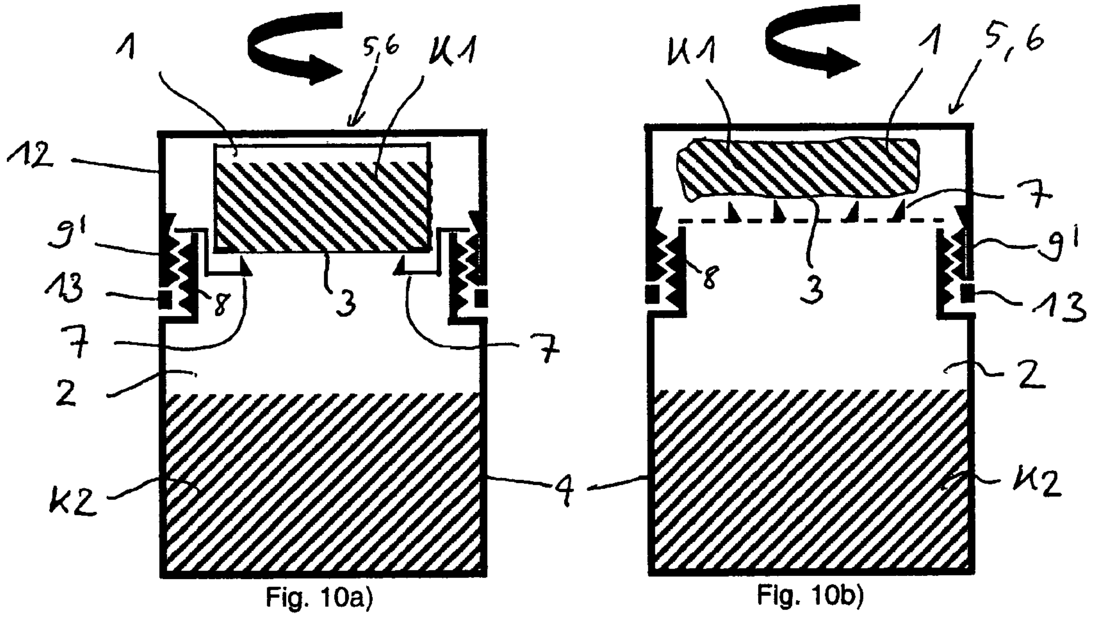
Fig. 10a) Fig. 10b)

Fig. 10e')

Figure 10 (continued)
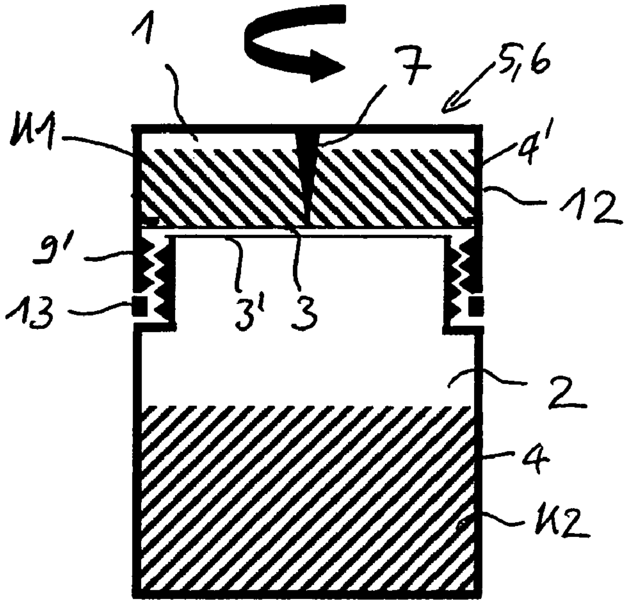
Fig. 10f)
Figure 11
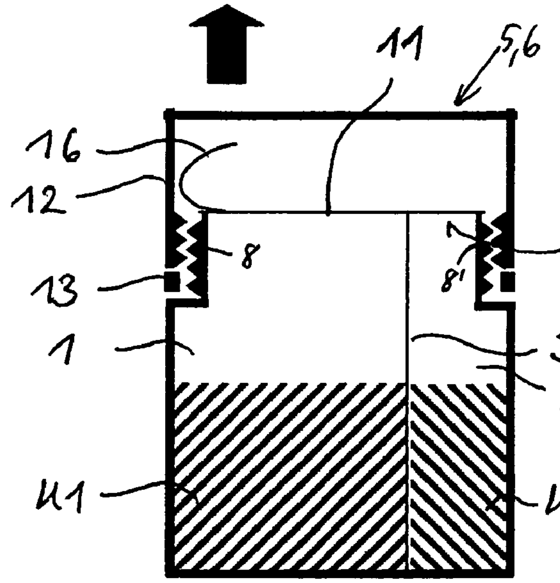
Fig. 11a)
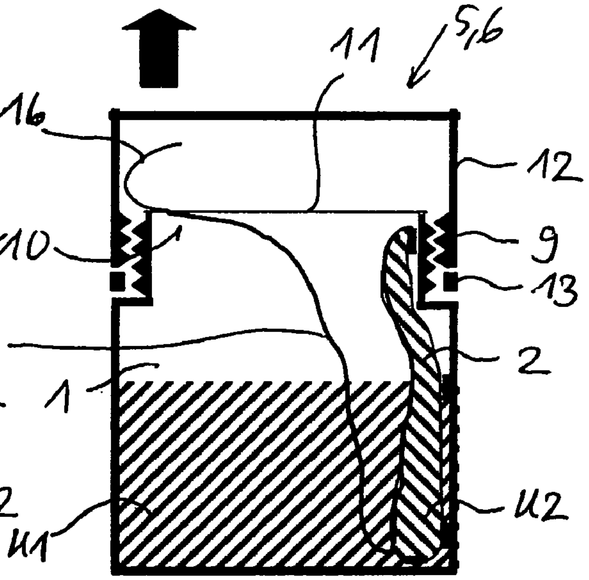
Fig. 11b)

TWO-COMPONENT ADHESION PROMOTER COMPOSITION AND USE OF PACKAGING COMPRISING TWO COMPARTMENTS

This application is a continuation of application No. 10/593,623, filed on Jun. 16, 2008. This application claims the priority of PCT Application No. PCT/EP2005/051355, filed Mar. 23, 2005 and European Application No. 04006906.4, filed on Mar. 23, 2004, the disclosure of which is incorporated herein by reference in its entirety.

TECHNICAL FIELD

The invention pertains to the field of two-component adhesion promoter compositions for surface pretreatment.

The invention likewise pertains to the use of a pack having two compartments.

PRIOR ART

Adhesion promoter substances have been used for a long time for improving adhesion, particularly that of adhesives and sealants. In particular, silane compounds and titanate compounds have long been known as adhesion promoter substances of this kind. It has emerged that specifically, depending on material and nature of the surfaces and on the adhesive or sealant used, it is necessary to select very specific adhesion promoter substances or mixtures thereof. These adhesion promoter compositions are used as primers or adhesion activators for the pretreatment of surfaces on which adhesion bonding, or sealing, is to take place. First, in the prior art, adhesion promoter substances of this kind are dissolved in an inert, volatile solvent, and as a result are storable for prolonged periods in the absence of moisture. When this adhesion promoter composition is applied to a surface, the volatile solvent evaporates, and the atmospheric moisture hydrolyzes the adhesion promoter substances and causes them to undergo condensation with one another and also, where appropriate, with polar groups on the surface. This reaction, however, requires a certain time until the adhesion is developed.

When these adhesion promoter substances come into contact with water, they undergo hydrolysis and condensation to form oligomers and/or polymers. When such oligomers, and particularly such polymers, are applied, however, the adhesion promoter effect is very frequently markedly poorer or is lost entirely. It has emerged that the development of adhesion is often inadequate if a very quick-crosslinking adhesive, in particular a very quick polyurethane adhesive, is applied to the adhesion promoter composition.

Because the prevailing trend in the market is away from volatile solvents—often also referred to as VOC (Volatile Organic Compounds), ways have been sought to produce aqueous adhesion promoter compositions. Aqueous silane primers of this kind are described for example in EP 0 577 014 B1 and EP 0 985 718 A2. U.S. Pat. No. 6,511,752 describes an aqueous primer based on a silane/titanate mixture. Common to all of these known aqueous silane compositions is the fact that their preparation requires a very costly and inconvenient production process with a very large number of added substances. In order to ensure a somewhat acceptable storage stability, these processes are limited, moreover, to specific silanes or titanates. The shelf life of the commercially available aqueous pretreatment products is very limited and is typically less than 6 months.

There are a variety of packaging designs, particularly in the food sector and in the pharmaceutical industry, which feature two chambers separate from one another.

FR 2 616 322, for example, describes a device having two compartments for the sterile dissolution of reactive components.

DESCRIPTION OF THE INVENTION

It is an object of the present invention, therefore, to provide an adhesion promoter composition which is stable on storage for a very long time, is easy to produce, and can be applied easily and reliably to a surface, along with an associated pack.

Surprisingly it has now emerged that this object can be achieved by a two-component adhesion promoter composition for surface pretreatment.

The core of the invention is that at least one hydrolyzable adhesion promoter substance and one compound which reacts with the adhesion promoter substance or which triggers or catalyzes condensation of the adhesion promoter substance are stored in compartments which are separated from one another by a dividing wall.

Surprisingly it has emerged that the results achievable with a freshly produced adhesion promoter solution are significantly better than with a composition of the same kind produced a long time beforehand.

Also found has been the use of a pack and also a package.

A pack of this kind is very easy for the user to use and, as and when required, a freshly produced composition can be applied and hence profit obtained from the advantages. The pack is suitable in principle for all adhesion promoter substances which are stable in the absence of moisture, as a result of which it is possible to employ a significantly broader range of possible adhesion promoter substances, since the optimum adhesion promoter substance or composition can be used without having to take account of the storage stability of the mixed composition.

BRIEF DESCRIPTION OF THE DRAWINGS

Exemplary embodiments of the invention are elucidated in more detail below, with reference to the drawings. Within the various figures, elements that are alike have been given the same reference symbols. The direction of forces is indicated by arrows.

FIG. 1 shows a cross section through an embodiment P1 having a rupturable dividing wall, FIG. 2 shows a cross section through an embodiment P2 having a bursting aid, in particular a cutting means, FIG. 3 shows a cross section through an embodiment P3 having a seal, FIG. 4 shows a cross section through an embodiment P4 having an extractable dividing wall, FIGS. 5-9 show a cross section through preferred embodiments of P1

FIG. 11 shows a cross section through preferred embodiments of P4

Figure 10:
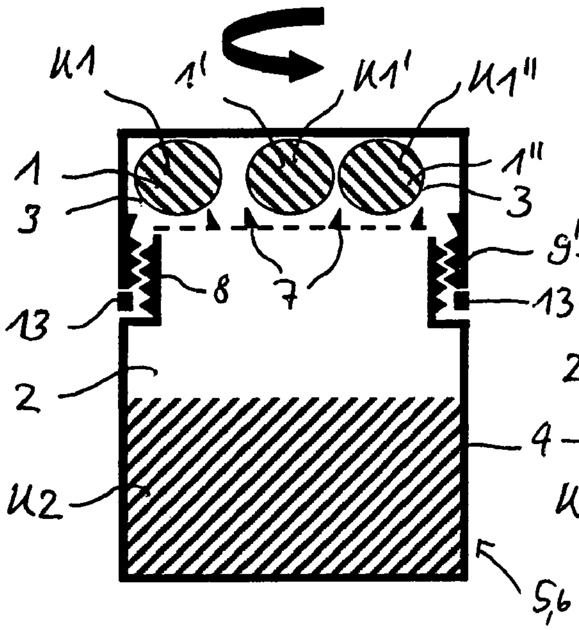
FIG. 10 shows a cross section through preferred embodiments of P2

Only those elements critical to the direct understanding of the invention have been shown. Motions and pressures have been indicated by arrows.

WAYS OF IMPLEMENTING THE INVENTION

The present invention relates to a two-component adhesion promoter composition for surface pretreatment that comprises two components, the first component, K1, comprising at least one hydrolyzable adhesion promoter substance A which is selected from the group comprising organosilicon compounds, organotitanium compounds, organozirconium compounds, and mixtures thereof. Additionally the second component, K2, comprises at least one compound B which reacts with the adhesion promoter substance A or triggers or catalyzes condensation of the adhesion promoter substance A. In the unopened state, the first and the second components are present in two compartments separated from one another by at least one dividing wall.

The invention further provides for the use of a pack which has two compartments separated from one another by at least one dividing wall for the storage of two components K1, K2, as are described in detail in the two-component adhesion promoter composition in this document.

The invention further provides a package which is composed of a pack having two compartments separated from one another by at least one dividing wall and also of the two-component adhesion promoter composition of the invention.

The first component, K1, comprises or consists of at least one hydrolyzable adhesion promoter substance A.

The at least one hydrolyzable adhesion promoter substance A can be an organosilicon compound. Suitability is possessed in principle by all those organosilicon compounds known to the skilled worker that are used as adhesion promoters. Preferably this organosilicon compound carries at least one, in particular at least two, alkoxy group or groups which is or are attached via an oxygen-silicon bond directly to a silicon atom. Additionally the organosilicon compound carries at least one substituent which is attached via a silicon-carbon bond to the silicon atom and which optionally has a functional group which is selected from the group comprising oxirane, hydroxyl, (meth)acryloyloxy, amino, mercapto, and vinyl group. In particular the hydrolyzable adhesion promoter substance A is a compound of the formula (I)

(I)

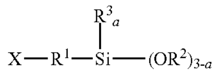

The substituent $R^1$ in this formula is a linear or branched, optionally cyclic, alkylene group having 1 to 20 C atoms, with or without aromatic components, and optionally with one or more heteroatoms, especially nitrogen atoms.

The substituent $R^2$ is an alkyl group having 1 to 5 C atoms, especially methyl or ethyl.

Furthermore, the substituent $R^3$ is an alkyl group having 1 to 8 C atoms, especially methyl, and the substituent X is an H or a functional group which is selected from the group comprising oxirane, OH, (meth)acryloyloxy, amine, SH, and vinyl.

Finally, a is one of the values 0, 1 or 2. Preferably a=0.

Preferred substituent $R^1$ is methylene, propylene, methylpropylene, butylene or dimethylbutylene group. Preferably $R^1$ is a propylene group.

Suitable organosilicon compounds are readily available commercially and with particular preference are selected from the group comprising methyltriacetoxysilane, ethyltriacetoxysilane, 3-methacryloyloxypropyltrialkoxysilanes, 3-aminopropyltrialkoxysilanes, bis[3-(trialkoxysilyl)propyl]amines, tris[3-(trialkoxysilyl)propyl]amines, 3-aminopropyltrialkoxysilanes, N-(2-aminoethyl)-3-aminopropyltrialkoxysilanes, N-(2-aminoethyl)-N-(2-aminoethyl)-3-aminopropyltrialkoxysilanes, 3-glycidyloxypropyltrialkoxysilanes, 3-mercaptopropyltrialkoxysilanes, vinyltrialkoxysilanes, methyltrialkoxysilanes, octyltrialkoxysilanes, dodecyltrialkoxysilanes, and hexadecyltrialkoxysilanes, particular suitability being possessed by the methoxysilanes and ethoxysilanes of the abovementioned compounds.

The at least one hydrolyzable adhesion promoter substance A can also be an organotitanium compound. Suitability is possessed in principle by all those organotitanium compounds known to the skilled worker that are used as adhesion promoters.

Particular suitability is possessed by organotitanium compound which carries at least one functional group which is selected from the group comprising alkoxy group, sulfonate group, phosphates, carboxylate group, and acetylacetonate, or carries mixtures thereof, and which is attached via an oxygen-titanium bond directly to a titanium atom.

Alkoxy groups which have proven particularly suitable are, in particular, isopropoxy substituents and so-called neoalkoxy substituents, particularly those of the following formula

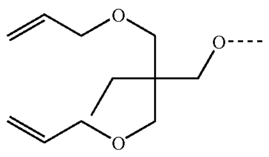

Sulfonic acids which have proven particularly suitable are, in particular, aromatic sulfonic acids whose aromatics are substituted by an alkyl group. Considered preferred sulfonic acids are radicals of the following formula

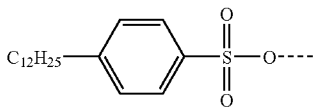

Carboxylate groups which have proven particularly suitable are, in particular, carboxylates of fatty acids. Considered preferred carboxylates are stearates and isostearates.

In all of the above formulae the dashed bond in this case shows the connection to the titanium atom.

Organotitanium compounds are available commercially, as for example from the company Kenrich Petrochemicals or DuPont. Examples of suitable organotitanium compounds are, for example, Ken-React® KR TTS, KR 7, KR 9S, KR 12, KR 26S, KR 33DS, KR 38S, KR 39DS, KR44, KR 134S, KR 138S, KR 158FS, KR212, KR 238S, KR 262ES, KR 138D, KR 158D, KR238T, KR 238M, KR238A, KR238J, KR262A, LICA 38J, KR 55, LICA1, LICA 09, LICA 12, LICA 38, LICA 44, LICA 97, LICA 99, KR OPPR, KROPP2 from Kenrich Petrochemicals, or Tyzor® ET, TPT, NPT, BTM AA, AA-75, AA-95, AA-105, TE, ETAM from DuPont. Those preferred are Ken-Reacts® KR 7, KR 9S, KR 12, KR 26S, KR 38S, KR44, LICA 09, LICA 44 and Tyzor® ET, TPT, NPT, BTM, AA, AA-75, AA-95, AA-105, TE, ETAM from DuPont.

The at least one hydrolyzable adhesion promoter substance A can additionally be an organozirconium compound. Suitability is possessed in principle by all those organozirconium compounds known to the skilled worker that are used as adhesion promoters. Particularly suitable organozirconium compounds are those which carry at least one functional group which is selected from the group comprising alkoxy group, sulfonate group, carboxylate group, and phosphate, or carries mixtures thereof, and which is attached via an oxygen-zirconium bond directly to a zirconium atom.

Alkoxy groups which have proven particularly suitable are, in particular, isopropoxy substituents and so-called neoalkoxy substituents, particularly those of the following formula

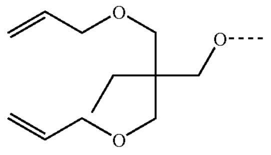

Sulfonic acids which have proven particularly suitable are, in particular, aromatic sulfonic acids whose aromatics are substituted by an alkyl group. Considered preferred sulfonic acids are radicals of the following formula

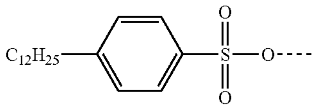

Carboxylate groups which have proven particularly suitable are, in particular, carboxylates of fatty acids. Considered preferred carboxylates are stearates and isostearates.

In all of the above formulae the dashed bond in this case shows the connection to the zirconium atom.

Organozirconium compounds are available commercially, as for example from the company Kenrich Petrochemicals. Examples of suitable organozirconium compounds are, for example, Ken-React® NZ 38J, NZ TPPJ, KZ OPPR, KZ TPP, NZ 01, NZ 09, NZ 12, NZ38, NZ 44, NZ 97.

Additionally it is possible for the first component K1 to comprise mixtures of at least one organosilicon compound with at least one organotitanium compound and/or with at least one organozirconium compound. Likewise possible are mixtures of at least one organotitanium compound with at least one organozirconium compound. Preferred mixtures are those of at least one organosilicon compound with at least one organotitanium compound.

Particularly preferred mixtures are those of two or more organosilicon compounds or mixtures of one organosilicon compound with an organotitanium compound or organozirconium compound, respectively.

Mixtures of organosilicon compounds which have proven particularly appropriate are mixtures of adhesion promoter substances A of the formulae (I) where at least one of them carries substituents H as substituents X and at least one of these substances carries a functional group which is selected from the group comprising oxirane, (meth)acryloyloxy, amine, SH, and vinyl as substituents X. These mixtures preferably comprise mixtures of at least one alkyltrialkoxysilane with an aminoalkyltrialkoxysilane and/or mercaptoalkyltrialkoxysilane.

The second component, K2, comprises or consists of at least one compound B which reacts with the adhesion promoter substance A or which triggers or catalyzes condensation of the adhesion promoter substance A.

The compound B which reacts with the adhesion promoter substance A or which triggers or catalyzes condensation of the adhesion promoter substance A is preferably an organotin compound or an acid.

In one preferred embodiment the compound B is an organotin compound and preferably represents a dialkyltin diacetylacetonate or a dialkyltin dicarboxylate, and in particular is dibutyltin dilaurate or dibutyltin diacetate. Preferably compound B is dibutyltin dilaurate.

In a further preferred embodiment the compound B is an acid. The acid may be an organic acid or an inorganic acid. The acid typically has a pKa1 of less than 6.

Particularly suitable inorganic acids are acids containing phosphorus, acids containing sulfur. Those which have proven particularly suitable are sulfonic acid or phosphoric acid, especially sulfuric acid.

Particularly suitable organic acids include formic, acetic, amino acid. Acetic acid has proven particularly suitable.

Further constituents in the first K1 and/or second K2 component are possible. Particular mention may be made for this purpose of typical constituents such as solvents, binders, fillers, mixing assistants, and additives. Preferred solvents are volatile solvents such as water, alcohols, especially ethanol, isopropanol, butanol, aldehydes or ketones, especially acetone, methyl ethyl ketone, hydrocarbons, especially hexane, heptane, cyclohexane, xylene, toluene, white spirit, and mixtures thereof, especially ethanol, methanol, isopropanol or hexane.

Suitable binders are particular film-forming binders, such as prepolymers and adducts of polyisocyanates or epoxy resins. Preference is given to polyurethane prepolymers which contain isocyanate groups and are prepared from polyols and polyisocyanates.

Preferred fillers are carbon blacks, pyrogenic silicas, chalks, whose surface has been modified if required.

Mixing assistants are preferably beads, especially metal beads or glass beads.

Additives particularly include flow control agents, defoamers, surfactants, biocides, antisettling agents, stabilizers, inhibitors, pigments, dyes, corrosion inhibitors, and odorants.

When selecting the additional possible constituents for the first K1 and/or second K2 component, however, it must be borne in mind that these additional constituents do not lead to storage stability problems or do not react with the compounds present in the respective components, particularly A, and/or B.

At room temperature the first K1 and second K2 components have a consistency which is between liquid and pulverulent, it being necessary for at least one of the components to have a certain liquid fraction. With particular preference the first K1 and the second K2 components are liquid, because liquid components, and especially highly mobile liquid components, can be mixed more effectively than highly pasty components. With preference the first K1 and second K2 components are a solution, a suspension or a dispersion. In the case of a suspension or a dispersion, the stability is an important feature. The stability can be controlled by the skilled worker by means, for example, of varying solvent, concentrations, production process parameters, or by using suitable additives, especially surfactants, emulsifiers, co-emulsifiers or stabilizers.

Particularly suitable first K1 and second K2 components have a storage stability of at least 6 months, in particular at least 9 months, without instances of precipitation or separation. Although the absence of instances of precipitation or separation is preferred, slight precipitation or separation is nevertheless not detrimental if it can be reversed by shaking, in particular by shaking for less than 10 minutes.

In one preferred embodiment of a two-component adhesion promoter composition the first component comprises at least one organosilicon compound A, at least one polyurethane prepolymer having at least two isocyanate groups, and, if desired, carbon black and, if desired, a volatile solvent.

In another preferred embodiment of a two-component adhesion promoter composition the first component comprises at least one organosilicon compound A and/or at least one organotitanium compound and/or at least one organozirconium compound and the second component comprises water and at least one acid. The pH of the mixed two-component adhesion promoter composition is preferably between 2 and 8, in particular between 3 and 5.

The compartments in which the two components K1 and K2 are located are separated from one another by at least one dividing wall. The possible and preferred embodiments of the compartments and of the dividing walls are described schematically below.

FIG. 1 shows an embodiment P1 of a package 6 and, respectively, of a pack 5 that is used. In this embodiment the dividing wall 3 is manufactured from a fragile material. FIG. 1*a* shows a version in which the first compartment 1 is not completely surrounded by the second compartment 2, while FIG. 1*b* describes a version in which the first compartment 1 is completely surrounded by the second compartment 2. The dividing wall 3 between the two compartments ruptures on application of pressure, as a result of which the two components K1 and K2 can come into contact, mix and/or react with one another. The pressure is typically produced from outside by the action of force on the outer wall 4, 4' of the compartments. This action of force is preferably an impact or flexing of the pack. The material of the dividing wall 3 is typically manufactured from glass, aluminum, an aluminum alloy, a thin plastic or a composite material. The dividing wall 3 must be manufactured in a thickness such that it does not rupture simply as a result of unintentional action of force, such as is commonly experienced in the course of transport, for example. The outer wall 4, 4' must be designed such that it does not rupture or tear when the pressure is applied that leads to the rupture of the dividing wall 3. The outer wall 4, 4' is manufactured either of a metal or of an elastic plastic.

FIG. 2 shows an embodiment P2 of a package 6 and, respectively, a pack 5 that is used, with bursting means, in particular cutting means 7. In this embodiment the pressure is applied to the dividing wall 3 by a cutting means 7. The cutting means 7 either is mobile and is pressed onto the stationary dividing wall 3, or else the cutting means 7 is fixed and the dividing wall 3 is pressed onto the cutting means 7. As a result of the pressure, the dividing wall 3 tears, so that the two components K1 and K2 can come into contact and/or react with one another. In the storage condition of the package, the cutting means 7 is preferably at a certain distance from the dividing wall 3. Cutting means 7 and dividing wall 3 can be displaced onto one another. This is accomplished either by application of pressure and hence by deformation of the outer wall 4, 4', or by means of a thread. The outer wall 4, 4' must be designed such that it does not itself rupture or tear when the pressure is applied that leads to the penetration of the dividing wall 3 by cutting means 7. The outer wall 4, 4' is manufactured either from a metal foil or an elastic plastic. The nature of the cutting means may in principle be very different in design. For instance, FIG. 2*a*) shows a sharp point as cutting means 7, while FIG. 2*b* shows a sphere as the bursting aid, in particular cutting means, 7. Preferably the cutting means 7 has either points or edges. Such points or edges make it easier to sever the dividing wall 3. Accordingly an embodiment as per FIG. 2*a* is preferred.

FIG. 3 shows an embodiment P3 of a package 6 and, respectively, of a pack 5 that is used. In this embodiment the dividing wall is realized by a seal 3'. In the unopened state of the pack 5, the seal 3' separates the two compartments 1, 2 from one another. This is achieved by virtue of the fact that, in the unopened state, the seal 3' is squeezed by at least two wall sections 8, 8' of the outer wall 4, 4'. At least one of the wall sections 8, 8' is designed such that it can be moved by external influence. Such mobility is achieved in particular by way of a thread 9, 9'. When opening is desired, the wall section 8, 8' is moved away from the squeezed seal 3', as a result of which the latter loses its sealing function and opens a passage, so that the two components K1 and K2 can come into contact and/or react with one another. In one particular version of this embodiment the seal 3' becomes so loose, when the pack is opened or shaken, that it falls into one compartment.

The seal 3' is manufactured from an elastic material, of the kind typically used for the sealing of liquids.

FIG. 3*a*) shows a configuration with one thread 9, while FIG. 3*b*) has two threads 9, 9'. FIG. 3*b*) is advantageous over 3*a*) since in a first step the first compartment can be filled with one component, K1 or K2, after which the seal 3' can be screwed on via a thread 9 and hence sealed tightly via the wall section 8, and, at a later point in time, this part, which has the function of a lid, can be screwed onto the second part of the package, which the other component, K2 or K1, with the second thread 9', and hence the second compartment as well can be sealed off tightly via the wall section 8'.

FIG. 4 shows an embodiment P4 of a package 6 and, respectively, of a pack 5 that is used. In this embodiment the dividing wall 3 is of extractable design. In this case there is, between the compartments, a thin dividing wall 3 which is extracted by external intervention, so that the two components K1 and K2 can come into contact and/or react with one another. The connecting points in the region where the dividing wall connects with the inner wall of the compartments 1, 2 have predetermined breakage points for this purpose. Particularly suitable for extraction are those embodiments in which the dividing wall 3 is connected to a tearing tab 16. FIG. 4*a*) shows a version in which only the dividing wall 3 is connected to the inner walls of the compartments 1, 2. The connecting points in the region where the dividing wall is connected to the inner-wall of the compartments 1, 2 have a predetermined breakage point for this purpose, in the same way as the region where the tearing tab 16 is connected to the outer wall. In FIG. 4*b*), when the dividing wall is extracted, at the same time the cover 11, which is connected to the tearing tab 16 and the dividing wall, is also separated from the package, so that an aperture 10 is formed through which the two components, which have come into contact with one another, can be removed from the pack.

FIG. 5 shows a preferred embodiment of embodiment P1. In this embodiment the first compartment 1 with one component K1 is composed of a fragile glass or plastic ampule 3. The second compartment 2 with the other component K2 is likewise a fragile glass or plastic ampule. The two ampules are disposed preferably in a tube-in-tube arrangement or—as depicted—in an ampule-in-ampule arrangement. This ampule arrangement is let into a container whose outer walls 4 are manufactured from flexible plastic or cardboard. Furthermore, this plastic container has an aperture 10 which is covered by a porous cover 20, in particular by a felt strip or a sponge. When the package is activated, the glass ampules are broken open by flexing of the outer walls 4 or an impact on the outer walls of the plastic or cardboard container, so that the components K1 and K2 can mix and/or react. The reaction mixture soaks the felt or sponge 20 and can be applied by means of contact of the latter with a surface. The felt or sponge additionally helps to prevent any splinters which might originate from the broken ampule from emerging from the package 5, 6. This embodiment P1 therefore constitutes a single-use package for the application of a two-component adhesion promoter composition. It is highly suitable especially for small quantities. In particular this package is suitable for the pretreatment of a vehicle window, in particular an automobile window.

FIG. 6 shows a further preferred embodiment of embodiment P1. In this case a fragile glass or plastic ampule 3 containing a component K1 is held in a bottle with a fixing agent 14 which contains the other component K2. FIG. 6*a*) shows an embodiment with a horizontal ampule 3. The ampule in this case can be broken, where appropriate, by a rigid means, a metal spatula for example, so that the components K1 and K2 can mix and/or react, or the ampule can be caused to burst by compression or impact on the bottle. The rigid means can be introduced through an opening in the bottle. After the means has been removed, the bottle can, if appropriate, be sealed and shaken. FIG. 6*b*) shows an embodiment with a vertical ampule 3. The ampule is designed such that it is longer than the height of the bottle and in the lid 12 protrudes into a fixing agent 14. The lid 12 carries a thread 9 and is preferably provided with a safety tab 13, which prevents the lid 12 being turned by mistake. When activation is desired, the safety tab 13 is removed and the lid 12 is turned, causing the base of the lid 12 to move toward the ampule 3 and cause it, under pressure, to break or tear, so that the components K1 and K2 can mix and/or react. The lid seal ensures, furthermore, that the bottle is impervious and can be shaken. In both embodiments, of FIGS. 6*a* and 6*b*, it is preferred that a felt or a fine net 20 is mounted for the application of the reaction mixture after the components K1 and K2 have been mixed, in order to hinder any splinters which may originate from the broken ampule from emerging from the package. It is preferred to use a felt or a sponge, since a felt or sponge is soaked with the two-component adhesion promoter composition and is therefore extremely suitable for its application. The felt or sponge is typically connected to a shaped part which has a thread and can be screwed onto the thread 9 of the bottle.

FIG. 7 shows a further preferred embodiment of embodiment P1. In this case, within a compartment 1, there is at least one metal ball as mixing aid 17. As a result of shaking, the dividing wall 3 between the two compartments is broken or torn by the ball 17, so that the components K1 and K2 can mix and/or react. If required, the ball 17 can be provided with points or edges in order to make it easier to tear the dividing wall 3. The thickness and nature of the dividing wall 3 and also the amount and surface design of the balls 17 used should be chosen such that the destruction of the dividing wall 3 is possible by simple shaking of the package 6, but not unwantedly, as in the case simply of small vibrations, such as occur during transport. As well as the version shown in FIG. 7*a*) with dividing wall 3 which stretches between the outer walls 4, 4' between the compartments, FIG. 7*b*) depicts a modification of the ampule 3 shown in FIG. 6 and containing one component.

FIG. 8 shows a further preferred embodiment of embodiment P1. In this embodiment, one component K1 is packaged in a compartment 1 which forms a bladder 21. In FIG. 8*a* the design of the bladder 21 is such that at its base it is connected to the dividing wall 3 and at that point has a predetermined breakage point. By removal of the safety tab 13, the lid 12 can be rotated down via the thread 9, as a result of which the base of the lid 12 moves toward the bladder. By this means the bladder 21 is squeezed until sufficient pressure is produced that the predetermined breakage point ruptures, so that the components K1 and K2 can mix and/or react. This embodiment is suitable in particular for highly mobile liquid components K1 and K2. An alternative possibility, after the removal of the safety tab 13, is for the lid 12 to be unscrewed and the bladder 1, 2 to be squeezed manually, by hand, with the component it contains extruded. In FIG. 8*b*) the bladder 21 has a clamp closure 18. As a result of the squeezing of the wall of the passage between compartments 1 and 2, this wall forms the dividing wall 3, which separates the two compartments 1 and 2 from one another in the unopened state. In the case of opening, the lid 12 is first unscrewed using thread 9. Subsequently the clamp closure 18 is removed, thereby opening the passage between compartments 1 and 2, so that components K1 and K2 can mix and/or react. This may be further assisted by the bladder 21 being pressed out. In both embodiments the bladder is preferably designed in such a way that it is connected to the wall section 8 of the other compartment 2 in such a way that it can be easily removed in order to allow a felt or a sponge to be subsequently fastened to the aperture 10, in particular by means of the thread 9, for the purpose of application of the adhesion promoter composition.

FIG. 9 shows a further preferred embodiment of the embodiment P1. In this case it takes the form of a bottle 5 or a double-hose pouch 5, which has two compartments 1, 2, which are separated from one another by a dividing wall 3 disposed in the lengthwise direction of the bottle or pouch. The outer walls 4, 4' of the bottle 5 or pouch 5 are manufactured from a highly elastic material, while the dividing wall 3 is manufactured either from a rigid material or in a very thin layer thickness. As a result of axial twisting of the bottle 5 or of the double pouch 5, the dividing wall is very severely stretched or loaded, so that the dividing wall 3 tears—depicted in FIG. 9'—so that the components K1 and K2 can mix and/or react. At its end the pouch or bottle preferably has a thread 9 with a tightly closing lid 12. After mixing or shaking has been carried out, this lid 12 can be opened and the reaction mixture can be applied to a surface. In addition, with preference, a felt can be screwed onto this thread 9.

FIG. 10 shows a preferred embodiment of embodiment P2. In this case one compartment 1 forms a part of the lid 12 of a bottle 5. FIGS. 10*a*)-*f*) show different preferred arrangements in this context.

In FIG. 10*a*) the cutting means 7 are connected to the wall section 8 or lie on it, in the form for example of a ring, and are directed toward the dividing wall 3 of the compartment 1, 2. As a result of removal of the safety tab 13, it is possible for the lid 12 and hence the compartment 1, 2 to be moved by way of the thread 9', by rotation, toward the cutting means 7. When the cutting means 7 make contact with the dividing wall 3, which is manufactured from a severable material, the wall 3 is cut through, so that the components K1 and K2 can mix and/or react. If the cutting means 7 are arranged eccentrically in relation to the axis of rotation of the lid 12—as shown in FIG. 10*a*)—then further rotation of the lid produces an incision in the form of a curve in the dividing wall 3, so that the dividing wall can be folded away or even cut out, which is very advantageous for the mixing of components K1 and K2.

In FIG. 10*b*) a plurality of cutting means 7 are arranged in distribution over the aperture of the bottle. Between the cutting means there are passages for the component K1, K2 in the compartment 1, 2. Typically this type is achieved by means of a perforated plate or net with points which is directed against the dividing wall and which lies on or is connected to the wall section 8. By removal of the safety tab 13 it is possible for the lid 12 and hence the chamber 1, 2 to be moved by way of the thread 9', by means of rotation, towards the cutting means 7. When the cutting means 7 make contact with the dividing wall 3, which is manufactured from a severable material, the wall 3 is cut through, so that the components K1 and K2 can mix and/or react. The presence of a plurality of cutting means 7 arranged in this way has the advantage that at the same time the dividing wall 3 is perforated at a number of locations simultaneously and hence the dividing wall is efficiently destroyed.

Figure 10C:
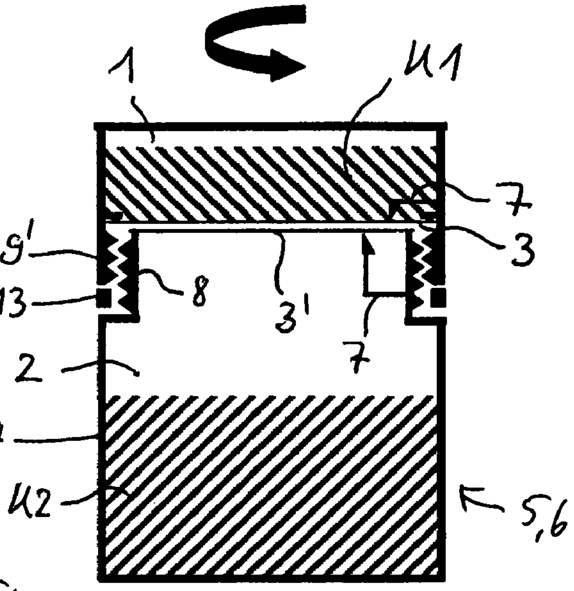

In FIG. 10*c*) the component K1 is packed in different compartments, 1, 1', 1", which form a part of the lid 12. These compartments 1, 1', 1" may be filled balls or pouches manufactured from a severable or rupturable material. Furthermore, it is possible in principle for these compartments 1, 1', 1" to be able to contain different components K1, K1', K1". Thus, for example, it would be possible to realize three-component or multicomponent adhesion promoter compositions in such a way, which would not be suitable for storage with one another or would lead to relatively poor adhesion promoter properties. A plurality of cutting means 7 are arranged in distribution over the aperture of the bottle. Between the cutting means there are passages for component K1 in compartment 1. Typically this type is achieved by means of a perforated plate or net which has points and is directed against the dividing wall, and which lies on or is connected to the wall section 8. By removal of the safety tab 13 it is possible for the lid 12 and hence the compartment 1 to be moved by way of the thread 9', by means of rotation, towards the cutting means 7. When the cutting means 7 make contact with the dividing wall 3 the wall 3 is cut through or ruptured, so that the components K1 and K2 can mix and/or react.

Figure 10D:
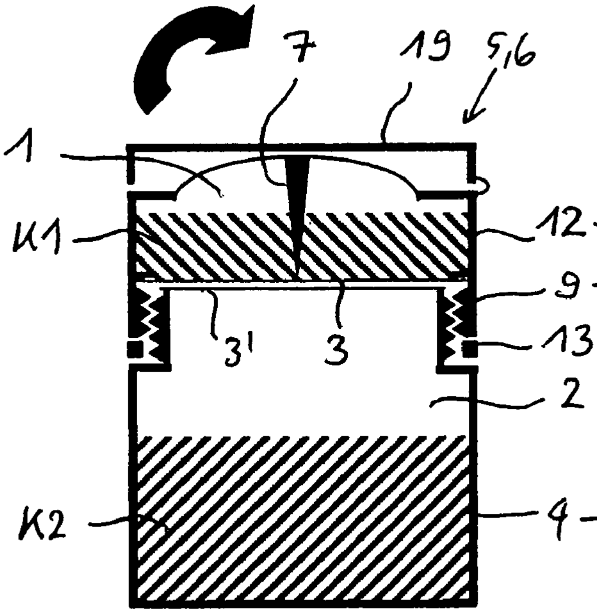

In FIG. 10*d*) the component K1 is stored in a compartment 1 which is manufactured from a severable film and which forms part of the lid 12. The other compartment 2 is sealed with a dividing wall 3'. In both compartments, cutting means 7 are mounted close to the two dividing walls 3, 3'. By removal of the safety tab 13 it is possible for the lid 12 to be rotated by way of the thread 9', as a result of which the cutting means 7 move toward one another and in this case cut through the dividing walls 3, 3', so that the components K1 and K2 can mix and/or react. This embodiment possesses the advantage that both compartments, 1 and 2, can be filled with the respective component K1 and K2, and can be stored imperviously separately from one another.

Figure 10E:
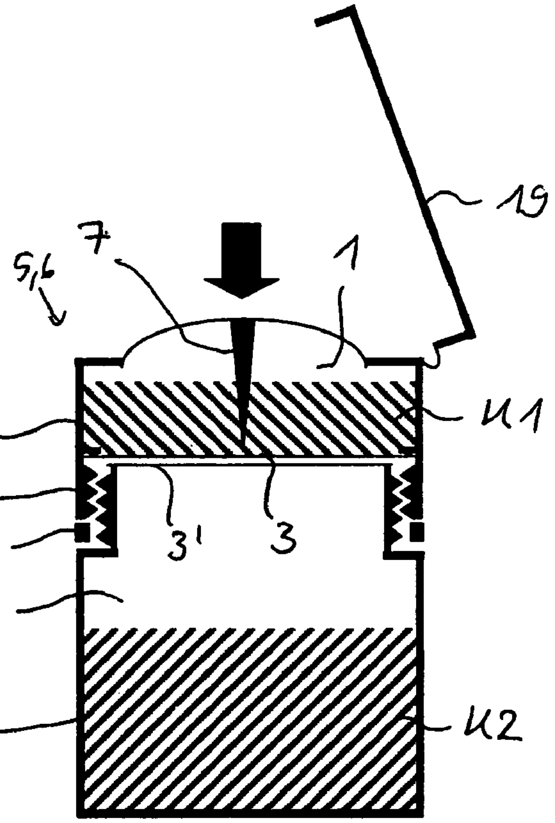

In FIG. 10*e*) an embodiment is shown in which one compartment 1 forms part of the lid 12, which is typically connected to the bottle with a thread 9, and where the lid has a protective cover 19 which can be folded open. Situated beneath this protective cover is one compartment 1. This compartment is manufactured from a deformable and severable material, a polymeric film, a metal foil or a composite sheet for example. Mounted on the inside of the compartment, on the side facing the protective cover, is a cutting means 7. This part of the compartment typically has a convexity toward the outside. When mixing is desired, the protective cover 19 is folded open—depicted in FIG. 10*e*')—and subsequently pressure is applied to the convexity, as a result of which the cutting means 7 is pressed onto the dividing walls 3, 3', so that these walls tear and the components K1 and K2 can mix and/or react.

The embodiment described in FIG. 10*f*) is very similar to that of FIG. 10*e*) with the cover. In this case one compartment 1 is part of the lid 12. The compartment is manufactured from a severable material. The other compartment, 2, is closed off by a dividing wall 3, which is likewise manufactured from a severable material. In the unopened state, the two walls 3, 3' which delimit the two compartments 1, 2 are arranged very close, preferably in contact with one another. By removal of the safety tab 13 and rotation of the lid 12 it is possible for said lid, together with the compartment 1, 2 and also the cutting means 7, to be moved toward the dividing wall 3 by way of the thread 9'. When the cutting means 7 come into contact with the dividing walls 3, the latter are cut through, so that the components K1 and K2 can mix and/or react. This embodiment as well possesses the advantage that both compartments, 1 and 2, can be filled with the respective component K1 or K2 and can be stored imperviously separately from one another.

FIG. 11 shows a preferred embodiment of embodiment P4. In this case the two compartments 1, 2 are separated from one another by an extractable dividing wall. In FIG. 11*a*), moreover, this dividing wall 3 is connected with the wall section 8 and 8', respectively, of the respective compartment 1, 2 and so forms a cover 11 to the aperture 10. On extraction, first of all, the cover 11 is opened by means of a tab 16. Thereafter the dividing wall 3 is extracted by means of the predetermined breakage points, which are located at the points where the dividing wall is connected to the inner wall of the compartments 1, 2, so that components K1 and K2 can mix and/or react. The lid can then be screwed on again and shaking, for example, can take place. Furthermore, for the purpose of application, a felt or sponge can be mounted on the aperture 10, in particular screwed on by means of the thread 9.

In FIG. 11*b*) the extractable dividing wall 3 is designed in such a way that it has a tearing tab 16 at the base of compartments 1, 2. This tearing tab 16 is connected, furthermore, to the cover 11 which seals the aperture 10 of the bottle. After the lid 12 has been removed, the cover 11 can be removed and then it is possible to pull on the tearing tab 16 or directly on the tab 16, so that the dividing wall 3 detaches from the bottom, by peeling, from the inner walls of the compartments, at the predetermined breakage points, so that components K1 and K2 can mix and/or react. The dividing wall can be produced, for example, by lightly welding a film tape to the inner wall section of a bottle. The tearing tab 16 is typically the rest of this film tape.

In all of the figures the first component K1 can be present in the first compartment 1 and the second component K2 can be present in the second compartment 2, or else the first component K1 can be present in the second compartment 2 and the second component K2 can be present in the first compartment 1.

The size of the compartments is preferably such that at least one compartment 1, 2 has a greater volume than the volume of the component K1, K2 present in it. With particular preference the volume not occupied by said component corresponds at least to the volume of the other component.

Moreover, the volume ratio K1/K2 of the first component K1 to the second component K2 is between 1000/1 and 1/1000, in particular between 200/1 to 10/1 or between 1/200 to 1/10. Preferably the volume ratio K1/K2 is between 200/1 to 20/1 or between 1/200 to 1/20.

At least the walls of the compartment in which the first component K1 is stored are preferably of one or more materials which impervious to diffusion of water in liquid or gaseous state or at least so impermeable that the desired storage stability is not adversely affected. Particularly suitable for this purpose are aluminum or glass or composites. Thus, for example, component 1 can be stored in an aluminum pouch or in an aluminum-coated plastic pouch. This kind of compartment has the advantage that the wall can be severed anywhere, and therefore that precise positioning of the pouch is not required. Pouches of this kind are suitable in particular for the embodiments according to FIG. 10.

The package 6 is produced by filling of the compartments 1 and 2 with components K1 and K2, followed where appropriate by the assembly of the pack. The package has good storage stability, typically of at least 6 months, in particular of at least 9 months. If the package 6 is to be used to apply an adhesion promoter, it can be activated specifically. For this purpose the dividing wall 3 must be removed or severed so that the components K1 and K2 can make contact, mix and/or react. Mixing may be assisted by shaking. Subsequently the adhesion promoter composition prepared in this way is removed from the package 6 and applied to a surface on which adhesive bonding or sealing is to take place. Depending on the nature of the chosen constituents in components K1 and K2, it may be necessary to allow a short time, typically less than half an hour, to elapse between contacting of the two components and their application, in order to achieve an optimum adhesion promoter effect. Preferably, however, the adhesion promoter composition is applied immediately. The surface may be composed of very different material, particular preference being given to glass, glass ceramics, metals, paints, and plastics. Where appropriate it may be necessary for the surface to be pretreated, prior to application of the adhesion promoter, by further chemical, physical or physicochemical methods. For application it is preferred to mount a porous cover 20, in particular a felt or a sponge, on a package 6 with aperture 10. A porous cover 20 of this kind is typically affixed to a shaped part which ensures, in the edge region, an assembly with the pack. This assembly is achieved preferably by way of a screw connection via a thread 9. The two-component adhesion promoter composition is applied in a layer thickness of less than 1 millimeter, typically in a layer thickness of less than 100 micrometers. If the adhesion promoter composition comprises fillers and/or binders, a layer thickness between 1 and 100 micrometers, in particular between 1 and 20 micrometers, is preferred. If the adhesion promoter composition comprises no fillers and no binder, a layer thickness is preferred which is between one molecular monolayer of the compound A and 50 micrometers, in particular between 2 nanometers and 10 micrometers, in particular between 10 nanometers and 1 micrometer.

EXAMPLES

Preparation, Examples 1-5

TABLE 1

| Two-component adhesion promoter compositions | 1 [Gew. %] | 2 [Gew. %] | 3 [Gew. %] | 4 [Gew. %] | 5 [Gew. %] |
|---|---|---|---|---|---|
| K1 | | | | | |
| 3-Mercaptopropyltrimethoxysilan (Silquest A-189, Osi Crompton) | 0.5 | | | | |
| 3-Aminopropyltrimethoxysilan (Silquest A-1110, Osi Crompton) | 0.5 | 1.0 | 0.5 | 1.0 | |
| N-(2-Aminoethyl)-3-aminopropyl-trimethoxysilan (Silquest A-1120, Osi Crompton) | | | | | 0.5 |
| Bis(pentan-2,4-dioano-O,O')(bis-isopropanolato)titan (Tyzor ® AA-75) | | | | 1.0 | 1.0 |
| Methyltrimethoxysilan (Fluka) | 0.25 | | 0.5 | | 0.5 |
| K2 | | | | | |
| Wasser deionisiert | 97.25 | 92.7 | 92.7 | 91.7 | 91.7 |
| Netzmittel (Tergitol TMN-6, Dow)) | 0.5 | 0.3 | 0.3 | 0.3 | 0.3 |
| Essigsäure | 1 | 6 | 6 | 6 | 6 |
| Total | 100 | 100 | 100 | 100 | 100 |

Components K1 and K2 were prepared separately from one another by mixing with stirring, the mixing of the three constituents of the first component K1 taking place under nitrogen.

The components were mixed and after 30 minutes the mixture was applied to different substrates by spreading using an impregnated paper cloth (Tela or Kleenex®). Subsequently the adhesive was applied after 10 minutes.

Preparation, Example 6

Example 6 is based on Sika® Aktivator (available commercially from Sika Schweiz AG). Sika® Aktivator is an adhesion promoter composition comprising an organosilicon compound A and an organotitanium compound A and also a volatile solvent. The Sika Aktivator is stored in one compartment, and dibutyltin dilaurate B in a second compartment. The amounts are such that 31 by weight of dibutyltin dilaurate is used, based on the weight of the Sika® Aktivator.

The components were mixed. Shortly after mixing, a yellow-orange coloration became apparent. After 10 minutes the mixture was applied to the various substrates by spreading with an impregnated paper cloth (Tela or Kleenex®). Subsequently the adhesive was applied after 10 minutes.

Substrate Preparation and Primer Application

| Substrate | Source |
|---|---|
| Float glass | Rocholl, Schönbrunn, Germany |
| Glass with bismuth-based ceramic coating Cerdec 14259 | Rocholl, Schönbrunn, Germany |
| AlMgSi1 | Rocholl, Schönbrunn, Germany |

The AlMgSi1 was roughened using abrasive paper.

The substrates were cleaned with an isopropanol/water mixture (1/1 w/w). After a waiting time of 5 minutes, the adhesion promoter composition was applied. In the case of glass, the tin side was not used for the adhesions.

Adhesive Application and Test Methods

Following the application of the adhesion promoter composition, a bead of an adhesive was applied to it. The adhesives in question were the following moisture-curing polyurethane or silane-modified polyurethane adhesives, available commercially from Sika Schweiz AG:

| | |
|---|---|
| Sikaflex ®-250 DM-1 | ('DM-1') |
| SikaTack ®-Ultrafast | ('STUF') |
| SikaTack ®-Plus Booster | ('STPB') |

The adhesive was tested after a cure time of 7 days of climate chamber storage ('CC') (23° C., 50% relative humidity) and after subsequent water storage for 7 days at 25° C. ('WB') and also after hot wet storage ('CP') for 7 days at 70° C. and 100% relative humidity.

The adhesion of the adhesive was tested by means of the 'bead test'. In this test an incision is made at the end just above the adhesion face. The incised end of the bead is held with round pliers and pulled from the substrate. This is done by carefully rolling up the bead on the tip of the pliers, and placing a cut vertical to the bead pulling direction down to the bare substrate. The rate of bead removal is selected so that a cut has to be made approximately every 3 seconds. The test length must amount to at least 8 cm. An assessment is made of the adhesive which remains on the substrate after the bead has been pulled off (cohesive fracture). The adhesion properties are evaluated by estimation of the cohesive fraction of the adhesion face:

1=>95% cohesive fracture

2=75-95% cohesive fracture

3=25-75% cohesive fracture

4=<25% cohesive fracture

5=adhesive fracture

The addition "F" indicates that the adhesive exhibits film adhesion on the primer, so that the fracture occurs between primer and adhesive. Test results with cohesive fractures of less than 75% are considered inadequate.

High-speed strength: the early strength was determined by means of a high-speed tensile test after 1 hour of curing under different curing conditions. Measuring speed 1 m/s.

FOG: the early strength was measured by means of a Zwick apparatus. Measuring speed 200 mm/min after curing for 2 hours at 23° C. and 50% relative humidity.

Results

TABLE 2

Adhesion results for bead test with evaluation after different forms of storage (CC/WB/CP).

| | STUF | | | DM-1 | | |
|---|---|---|---|---|---|---|
| | AlMgSi1 | Glass | Bi-ceramic | AlMgSi1 | Glass | Bi-ceramic |
| Ref. 1 | 5/5/1 | 5/5/2 | 5/5/1 | 5/5/5 | 5/5/5 | 5/5/5 |
| Ref. 2 | 3/5F/1 | 5F/5F/1 | 5/5/1 | 5/5/5 | 5/5/5 | 5/5/5 |
| Ref. 3 | 5F/4F/1 | 3/2/2 | 5/5/1 | 5/5/5 | 5/5/5 | 5/5/5 |
| 1 | 1/1/1 | 1/1/1 | 1/1/1 | 1/2/3 | 1/1/1 | 1/1/1 |
| 2 | 1/4/2 | 2/4/3 | n.m. ‡ | n.m. ‡ | 2/4/3 | n.m. ‡ |
| 3 | 1/4/3 | 1/2/1 | n.m. ‡ | n.m. ‡ | 1/2/1 | n.m. ‡ |
| 4 | 2/4/3 | 1/2/1 | n.m. ‡ | n.m. ‡ | 1/2/1 | n.m. ‡ |
| 5 | 1/3/3 | 1/4/2 | n.m. ‡ | n.m. ‡ | 1/4/2 | n.m. ‡ |

‡ n.m. = not measured

Ref. 1 is the comparative example without application of adhesion promoter. In the case of Ref. 2 only water was applied and in Ref. 3 an application of water/surfactant (concentration analogous to example) was carried out. Application took place in the same way as for the adhesion promoter compositions, that is, by means of impregnated paper cloth (Tela or Kleenex®).

In the case of Example 6 the development of early strength was determined in comparison to Sika® Aktivator. For that purpose, aluminum panels were cleaned with isopropanol/water mixture as described, after which the primer Sika® Primer-206 G+P was applied with a brush, left to evaporate for 10 minutes at 25° C., and subsequently Example 6, or, for comparison, Sika® Aktivator, was applied by means of impregnated paper cloth (Tela or Kleenex®) and, finally, bonded with SikaTack®-Ultrafast or SikaTack®-Plus Booster.

TABLE 3

High-speed test (1 m/s) with STBP.

| | Sika Aktivator ® (comparison) | 6 | |
|---|---|---|---|
| Strength [N/mm$^2$] | | | |
| −10° C./90% relative humidity | 0.72 | 0.91 | +26% |
| 5° C./90% relative humidity | 1.14 | 1.4 | +23% |
| 23° C./50% relative humidity | 1.16 | 1.3 | +12% |
| Energy [J] | | | |
| −10° C./90% relative humidity | 1.7 | 2.1 | +24% |
| 5° C./90% relative humidity | 4 | 5.2 | +30% |
| 23° C./50% relative humidity | 6 | 13.3 | +122% |

TABLE 4

FOG measurements with STUF.

| | Sika Aktivator ® (comparison) | 6 | |
|---|---|---|---|
| Strength [N/cm] | 27.7 | 38.7 | +40% |
| Energy [J] | 3.05 | 5.1 | +67% |

The results show that with the two-component adhesion promoter compositions of the invention it is possible to achieve excellent adhesion on different substrates and with different adhesives, which is also manifested in a rapid development of adhesion.

LIST OF REFERENCE SYMBOLS

K1 first component
K2 second component
1 first compartment
2 second compartment
3 dividing wall
3' seal
4 outer wall
4' outer wall
5 pack
6 package
7 cutting means
8 wall section
8' wall section
9 thread
9' thread
10 aperture
11 cover
12 lid
13 safety tab
14 fixing agent
15 mixing aid
16 tearing tab
17 mixing aid
18 clamp closure
19 protective cover
20 porous cover
21 bladder

The invention claimed is:

1. A package comprising
two compartments separated from one another by at least one dividing wall; and
a two-component adhesion promoter composition for surface pretreatment, comprising two separately contained components,
the first component, K1, comprising at least one hydrolyzable adhesion promoter substance A which comprises an organosilicon compound and at least one compound selected from the group consisting of an organotitanium compound, an organozirconium compound and a mixture thereof, and
the second component, K2, comprising water and at least one compound B which reacts with the adhesion promoter substance A or triggers or catalyzes condensation of the adhesion promoter substance A,
wherein the first and second components K1, K2 are separately contained in the two compartments,
wherein the compound B in the second component K2 is an organotin compound or an acid.

2. The package of claim 1, wherein the hydrolyzable adhesion promoter substance A comprises an organosilicon compound which carries at least one alkoxy group which is or are attached via an oxygen-silicon bond directly to a silicon atom.

3. The package of claim 2, wherein the organosilicon compound carries at least one substituent which is attached via a silicon-carbon bond to the silicon atom and which optionally has a functional group selected from the group consisting of oxirane, hydroxyl, (meth)acryloyloxy, amino, mercapto, and vinyl group.

4. The package according to claim 2, wherein said organosilicon compound carries at least two alkoxy groups attached via an oxygensilicon bond directly to a silicon atom.

5. The package of claim 1, wherein the hydrolyzable adhesion promoter substance A comprises an organotitanium compound which carries at least one functional group which is selected from the group consisting of alkoxy group, sulfonate group, phosphate group, carboxylate group and mixtures thereof and which is attached via an oxygen-titanium bond directly to a titanium atom.

6. The package of claim 5, wherein the alkoxy group is a methoxy, butyl or isopropyl group.

7. The package according to claim 6, wherein the alkoxy group is an isopropyl group.

8. The package of claim 1, wherein the first component K1 comprises at least one hydrolyzable adhesion promoter substance A which is an organosilicon compound and at least one hydrolyzable adhesion promoter substance A which is an organotitanium compound.

9. The package of claim 1, wherein the compound B is an organotin compound.

10. The package according to claim 9, wherein compound B is dibutyltin dilaurate or dibutyltin diacetate.

11. The package of claim 1, wherein the compound B is an inorganic acid.

12. The package according to claim 11, wherein said inorganic acid contains phosphorus or sulfur.

13. The package of claim 1, wherein the compound B is an organic acid.

14. The package according to claim 13, wherein said organic acid is formic, acetic or amino acid.

15. The package of claim 1, wherein the first component K1 and/or the second K2 component further comprises a volatile solvent.

16. The package according to claim 15, wherein the volitale solvent is ethanol, methanol, isopropanol or hexane.

17. The package of claim 1, wherein the first component K1 and/or the second K2 component is liquid.

18. A method for preparing the package of claim 1, comprising storing the first and second components K1 and K2 in the package.

19. The package of claim 1, wherein the at least one dividing wall is a seal which in the unopened state of the package separates the two compartments from one another.

20. The package of claim 19, wherein the seal in the closed state is squeezed by at least two wall sections, at least one wall section being configured as to be movable by external influence, such that upon the external influence the seal becomes loose and the two compartments are connected to one another.

21. The package according to claim 20, wherein said at least one wall section is configured to be moveable by external influence by a thread.

22. The package of claim 1, wherein the dividing wall in the region of the connection with the inner wall of the compartments has a predetermined breakage point and can be extracted from the pack.

23. The package of claim 22, wherein at least one compartment has a greater volume than that of the component therein.

24. The package according to claim 23, wherein the volume not occupied by said component corresponds to at least that volume of the other component.

25. The package of claim 1, wherein the dividing wall is manufactured from a material which ruptures or tears as a result of the application of pressure.

26. A method of opening the package of claim 25, comprising applying pressure to the dividing wall using a bursting aid.

27. The package according to claim 26, wherein the bursting aid is a cutting means.

28. The package of claim 1, wherein the volume ratio K1/K2 of the first component K1 to the second component K2 is between 1000/1 and 1/1000.

29. The package according to claim 28, wherein the ratio is between 200/1 to 10/1 or between 1/200 to 1/10.

30. The package according to claim 28, wherein the ratio is between 200/1 to 20/1 or 1/200 to 120.

31. The package of claim 1, wherein at least the walls of that compartment in which the first component K1 is stored comprises one or more materials which are impervious to diffusion of water in liquid or gaseous state.

32. The package according to claim 31, wherein said one or more materials which are impervious to diffusion of water in liquid or gaseous state comprise aluminum, glass, composites, or combinations thereof.

33. The package of claim 1, wherein the dividing wall is manufactured from a material which ruptures or tears upon application of pressure.

34. The package of claim 1, wherein at least the walls of the compartment in which the first component is stored are composed of one or more materials which are impervious to diffusion of water in liquid or gaseous state or at least so impermeable that the desired storage stability is not adversely affected.

35. The package according to claim 34, wherein said one or more materials which are impervious to diffusion of water in liquid or gaseous state or at least so impermeable that the desired storage stability is not adversely affected, comprise aluminum, glass, composites or combinations thereof.

36. The package of claim 1, wherein the volume ratio K1/K2 of the first component K1 to the second component K2 is between 1000/1 and 1/1000.

37. The package according to claim 36, wherein the ratio is between 200/1 to 10/1 or between 1/200 to 1/10.

38. The package according to claim 36, wherein the ratio is between 200/1 to 20/1 or between 1/200 to 1/20.

39. A method of applying the two-component adhesion promoter composition of the package according to claim 1, for surface pretreatment, the method comprising applying pressure to the dividing wall to rupture said wall, contacting and mixing the two components K1, K2, applying the composition to a substrate surface through an aperture of the package accessible by removal of a cover.

40. The method of claim 39, wherein mixing is brought about by shaking of the package.

41. The method of claim 39, wherein the composition is applied to the substrate immediately after contacting and mixing the two components K1 and K2.

42. A package comprising two compartments separated from one another by at least one dividing wall; and a two-component adhesion promoter composition for surface pretreatment, comprising two separately contained components, the first component, K1, comprising at least one hydrolyzable adhesion promoter substance A which comprises an organosilicon compound and at least one compound selected from the group consisting of an organotitanium compound, an organozirconium compound and a mixture thereof, and the second component, K2, comprising water and at least one compound B which reacts with the adhesion promoter substance A or triggers or catalyzes condensation of the adhesion promoter substance A, wherein the first and second components K1, K2 are separately contained in the two compartments, wherein the organosilicon compound of the hydrolyzable adhesion promoter substance A comprises a compound having the formula (I)

(I)

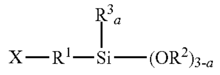

where $R^1$ is a linear or branched, optionally cyclic, alkylene group having 1 to 20 C atoms, with or without aromatic components, and optionally with one or more heteroatoms;

$R^2$ is an alkyl group having 1 to 5 C atoms;

$R^3$ is an alkyl group having 1 to 8 C atoms;

X is an H or a functional group which is selected from the group consisting of oxirane, OH, (meth)acryloyloxy, amine, SH, and vinyl; and a is 0, 1 or 2.

43. The package of claim 42, wherein the substituent $R^1$ is a methylene, propylene, methylpropylene, butylene, or dimethylbutylene group.

44. The package of claim 42, wherein the hydrolyzable adhesion promoter substance A comprises methyltriacetoxysilane, ethyltriacetoxysilane, 3-methacryloyloxypropyltrialkoxysilanes, 3-aminopropyltrialkoxysilanes, bis[3-(trialkoxysilyl)propyl]amines, tris[3-(trialkoxysilyl)propyl]amines, 3-aminopropyltrialkoxysilanes, N-(2-aminoethyl)-3-aminopropyltrialkoxysilanes, N-(2-aminoethyl)-N(2-aminoethyl)-3-aminopropyltrialkoxysilanes, 3-glycidyloxypropyltrialkoxysilanes, 3-mercaptopropyltrialkoxysilanes, vinyltrialkoxysilanes, methyltrialkoxysilanes, octyltrialkoxysilanes, dodecyltrialkoxysilanes, or hexadecyltrialkoxysilanes.

45. The package according to claim 44, wherein substance A comprises a methoxysilane or ethoxysilane.

46. The package according to claim 42, wherein $R^2$ is a methyl or ethyl group.

47. The package according to claim 42, wherein $R^3$ is a methyl group.

48. The package according to claim 42, wherein a is 0.

49. The package according to claim 42, wherein the substituent $R^1$ is a propylene group.

50. A package comprising two compartments separated from one another by at least one dividing wall; and a two-component adhesion promoter composition for surface pretreatment, comprising two separately contained components, the first component, K1, comprising at least one hydrolyzable adhesion promoter substance A which comprises an organosilicon compound and at least one compound selected from the group consisting of an organotitanium compound, an organozirconium compound and a mixture thereof, and the second component, K2, comprising water and at least one compound B which reacts with the adhesion promoter substance A or triggers or catalyzes condensation of the adhesion promoter substance A, wherein the first and second components K1, K2 are separately contained in the two compartments, wherein the hydrolyzable adhesion promoter substance A comprises the organosilicon compound and the organotitanium compound, and wherein the compound B comprises an organotin compound.

* * * * *